Oct. 18, 1949.  H. SNOW ET AL  2,484,966
ROTATING AND REVOLVING BRUSH MEANS FOR PREPARING
FIBROUS MOLDING COMPOSITIONS
Filed Oct. 6, 1945
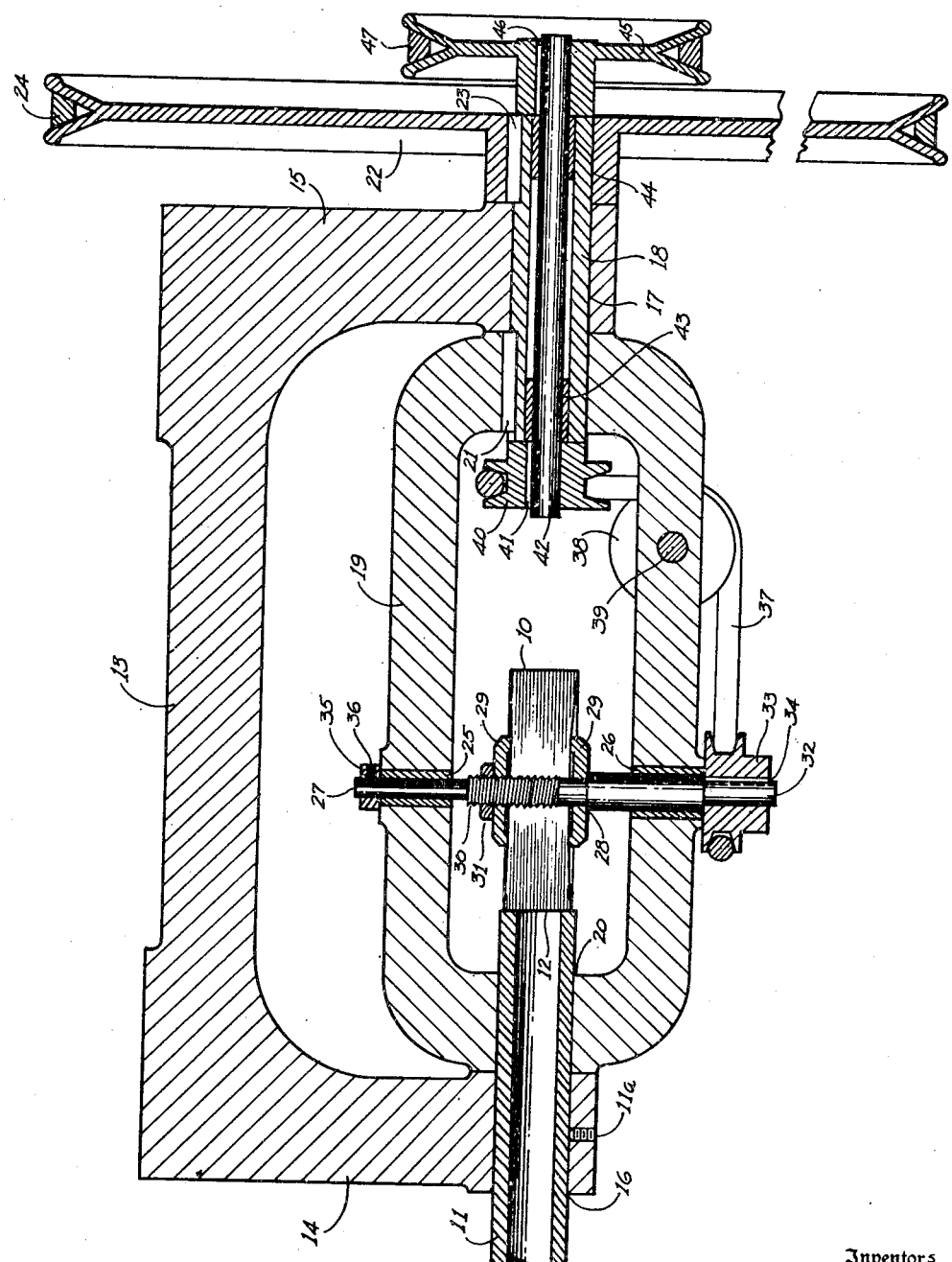
Inventors,
Howard Snow
Rudolph Howard Hocutt
Warley L. Parrott,
Attorney Patented Oct. 18, 1949

2,484,966

UNITED STATES PATENT OFFICE 2,484,966

ROTATING AND REVOLVING BRUSH MEANS FOR PREPARING FIBROUS MOLDING COMPOSITIONS

Howard Snow and Rudolph Hovan Hocutt, Charlotte, N. C., assignors to Southern Friction Materials Company, a corporation of North Carolina Application October 6, 1945, Serial No. 620,750

2 Claims. (Cl. 241—280)

This invention relates to the preparation of fibrous molding compositions, and constitutes an improvement of the means disclosed for this purpose in our copending application for patent, Ser. No. 496,356, filed July 27, 1943, now U. S. Patent No. 2,446,345, issued August 3, 1948 of which the present application is a continuation-in-part.

According to our above copending application a fibrous molding composition, which may be compounded by conventional procedures, is formed at a putty-like stage into a compact solid mass or billet, and this billet is then subjected to the action of a disintegrator element that disintegrates the billet to produce discrete, coated fibers which are still tacky. The disintegrating step is performed in accordance with the disclosure in our copending application by mounting the billet on a rotatable holder so as to position it for disintegrating contact with the disintegrator element, and then rotating the disintegrator element and moving it transversely in disintegrating contact with the rotatably mounted billet so that both the billet and disintegrator element are rotated during disintegration. This dual rotation results in what appears to be best described as a tearing disintegration which breaks down the billet to produce the discrete and still tacky, coated fibers without substantially shortening or weakening the fibers.

This manner of preparing a fibrous molding composition is in distinct contrast with the methods commonly employed in which the compounded molding composition is allowed to dry completely and is then disintegrated by rollers or a shaker screen to form a molding powder. The procedure disclosed in our copending application makes it unnecessary to effect complete drying before disintegration; and, moreover, produces discrete, coated fibers as mentioned above, which are still tacky and which retain most of their original length so that an interlocking and bonding of these fibers results upon molding that substantially enhances the physical properties of the ultimate molded product formed.

Pursuant to the present invention we have found that the preparation of a fibrous molding composition as disclosed in our above copending application can be substantially facilitated by extruding the compounded molding composition after it has reached the putty-like stage and subjecting the body of the composition issuing from the extrusion treatment to the tearing disintegration action effected by the two-way motion of a simultaneously rotated and revolved disintegrator element. The preparation of the molding composition in accordance with the present invention eliminates the necessity of forming the compounded molding composition into billets for disintegration, and has the further advantage of being well adapted for continuous operation.

The means of preparing a fibrous molding composition as disclosed in the present application find application in forming a variety of molded articles of which molded brake lining may be selected for purposes of illustration. Molded brake lining is commonly prepared by compounding asbestos fiber or the like, in the proportion of about 50 parts by weight, with about 30 parts of powdered fillers, such as barytes, carbon black, litharge, manganese dioxide, diatomaceous silica, ground waste brake linings, etc.; and 20 parts of an oil-resin binder, such as an oil modified phenolic resin; in the presence of about 25 parts of a suitable solvent, such as any of the usual naphtha or coal tar solvents.

The above ingredients are associated and mixed by any convenient means until thorough compounding is effected. The composition formed in this manner is then allowed to dry until it reaches the putty-like stage referred to above. At this point, the composition is introduced to any suitable feed means adapted for directing a forced feed of the composition through a delivery orifice and the body of the composition issuing from this delivery orifice is subjected to the above described tearing disintegration to break the composition down into light, fluffy, discrete, coated fibers which are still tacky and which have a consistency much akin to freshly fallen snow and may be picked up and packed quite similarly to the way one forms snow into a snow-ball. The discrete fibers formed in this manner may be recovered for a subsequent molding operation by means of a pocket collector provided in a suitable housing, or through use of a suitable conveyor system, such as a belt, vibrating feeder, or an air system which would deliver the fibers air borne to the molding operation. With any of the latter arrangements the process would be adapted for continuous operation, and the mass of discrete fibers might be fed in this manner to a continuous molding press of the type disclosed in the copending application for patent of Howard Snow, Ser. No. 466,501, filed November 21, 1942, now U. S. Patent 2,412,299, issued May 9, 1946.

The manner in which the compounded molding composition is disintegrated according to the present invention is further illustrated in the accompanying drawing which shows an assembly detail mainly in section of the disintegrating means.

As illustrated in the drawing the disintegrator element is indicated at 10, and the directing means of any appropriate forced feed equipment is shown at 11 terminating in a delivery orifice 12 disposed in relation to the disintegrator element 10. The disintegrator element 10 serviceably consists of a wire brush of the type commonly used in abrading molded brake linings. A suitable type of forced feed equipment is a conventional extruder comprising a feed screw supplied from an associated hopper and disposed to feed to the directing member 11. As shown in the drawing, the directing member 11 is tubular in form.

The disintegrating apparatus as a whole is mounted on a support bracket 13 which may in turn be supported from an appropriate mounting in the housing (not shown) provided for the disintegrating equipment. The support bracket 13 is formed with extending support arms 14 and 15. The support arm 14 is provided with an aperture 16 to receive the directing member 11 of the forced feed means and allow it to extend in relation to the disintegrator element 10. The directing member 11 is fitted carefully in the aperture 16 so that it has a stable support at this point, although a sliding fit may be employed to allow adjustment of the position of the extending end of the directing member 11 in relation to the disintegrator element 10. A set screw as indicated at 11a is arranged in relation to the aperture in support arm 14 to prevent rotation of directing member 11 during operation.

The other extending support arm 15 of support bracket 13 is also formed with an aperture 17, which is aligned with the aperture 16 in the support arm 14. This aperture 17 serves as a bearing in which a hollow shaft 18 is journaled. The hollow shaft 18 extends on the inner side of support arm 15 to carry a rotating frame 19 which is also carried for rotation by directing member 11 as at 20. The directing member 11 is thus employed to perform the auxiliary function of a bearing support for rotating frame 19, which allows the disintegrator element 10 to be positioned at the delivery orifice 12 as required according to the present invention.

A key 21 forms a driving connection between the rotating frame 19 and the hollow shaft 18; and shaft 18 extends on the outer side of supporting frame 15 to carry a driving pulley 22, which is keyed to shaft 18 as at 23 and driven by any suitable power means through a belt 24. Rotation of the driving pulley 22 will accordingly cause rotation of the frame 19 and revolve the disintegrator element 10 as previously mentioned during the disintegrating operation. And by virtue of the above described arrangement for mounting rotating frame 19, the disintegrator element 10 is revolved in place about an axis substantially coincident with the longitudinal axis of directing member 11.

The disintegrator element 10 is mounted in suitable bearings 25 and 26 in the rotating frame 19 on a shaft 27. The shaft 27 is disposed for free rotation in the bearings 25 and 26, and is formed with a portion of enlarged diameter providing a positioning shoulder 28 for the disintegrator element 10. The disintegrating element 10 is carried on shaft 27 between retaining washers 29, and shaft 27 is further provided with a threaded portion 30 allowing a nut 31 to bottom the disintegrator element 10 between retaining washers 29 against the positioning shoulder 28.

Shaft 27 extends beyond the rotating frame 19 as at 32 to receive a pulley member 33 in driving engagement through key 34, and is conditioned against sidewise displacement in rotating frame 19 by a collar 35 secured to the other end of the shaft by a set screw 36. By this arrangement disintegrator element 10 is disposed for rotation in rotating frame 19 about a transverse axis with respect to the longitudinal axis of directing member 11, and rotation of disintegrator element 10 may be effected simultaneously as frame 19 revolves.

Rotation of disintegrator element 10 is effected through a belt drive 37 running over intermediate pulleys 38 mounted in rotating frame 19 as at 39 to a pulley member 40. The pulley member 40 is keyed as at 41 to a shaft 42 which is journaled in appropriate bearings 43 and 44 in hollow shaft 18. Shaft 42 extends beyond hollow shaft 18 at its outer end to receive a second driving pulley 45 in keyed engagement as at 46. Driving pulley 45, as in the case of driving pulley 22, is driven from a suitable power source by a belt 47. Rotation of driving pulley 45 will accordingly effect rotation of the disintegrator element 10, and when power is supplied to both driving pulley 22 and pulley 45, disintegrator element 10 will be simultaneously rotated and revolved in place.

This two-way motion of the simultaneously rotated and revolved disintegrator element 10 effects the tearing disintegration action described above, and as disintegrator element 10 is disposed in relation to the delivery orifice 12 of directing element 11, the body of compounded molding composition issuing from delivery orifice 12 under the influence of the forced feed means employed will be subjected to this tearing disintegration action to form the molding composition of discrete and still tacky, coated fibers of the present invention.

In effecting the two-way motion of the disintegrator element 10 it is desirable to employ a relatively high rate of rotation as compared with the rate at which the disintegrator element 10 is revolved. We have found in practice that the rate of rotation should be about five or six times the rate at which disintegrator element 10 is revolved. Thus, we have satisfactorily employed a rotation speed of 1200 R. P. M., while revolving the disintegrator element 10 at 200 R. P. M. A higher ratio, and higher speeds, may be employed if desired, but problems of balancing the equipment are soon encountered if this is done.

Having selected the speeds at which disintegrator element 10 is to be rotated and revolved, the forced feed equipment is adjusted to load the disintegrator element 10 within its capacity. That is, the forced feed should present an adequate body of the compounded molding composition to the action of the disintegrator element 10, but the rate of feeding should not be so rapid as to cause the disintegrator element 10 to strain during operation. The proper rate of feeding is best selected by adjusting the rate on the basis of observation of the action of the disintegrator element 10.

The manner of disintegrating compounded molding compositions, as described above, provides a fibrous molding composition which as previously mentioned forms an interlocked and bonded structure upon molding which substantially enhances the physical properties of the molded products formed. Also, the handling necessary for preparation of the fibrous molding composition for use is substantially facilitated according to the present invention. A further feature of our invention is that it renders feasible the use of low grade waste fibers, such as cotton motes, short vegetable or animal fibers, lint, flock, scraps of yarn or cloth, and the like, as well as the usual fibers commonly employed in fibrous molding composition such as the asbestos fiber referred to above.

The references in the foregoing description and the following claims to "the tearing disintegration action" effected according to the present invention are thought to be apt in describing the unique results which applicants obtain. It will be understood, however, that these words have been selected as words of description and are not to be read as words of limitation.

We claim:

1. A disintegrating machine comprising a supporting frame, a forced feed means including a directing member terminating in a delivery orifice extending through one end of said supporting frame, a driven shaft extending through the opposite end of said supporting frame, a rotatable frame member mounted at one end on said driven shaft for rotation therewith and disposed at its other end for rotation on said directing member, a second driven shaft carried by said rotatable frame member in transverse relationship to the axis of rotation of said rotatable frame, and a disintegrator element mounted on said second driven shaft at said delivery orifice.

2. A disintegrating machine comprising a supporting frame having aligned apertures at each end thereof, an extrusion feed means including a directing member terminating in a delivery orifice extending through one of said apertures, a driven shaft extending through the other of said apertures, a rotatable frame mounted within said supporting frame, said rotatable frame being carried at one end on said driven shaft for rotation therewith and being disposed at its other end for rotation on said directing member, a second driven shaft carried by said rotatable frame in transverse relationship to the axis of said rotatable frame, and a disintegrator brush element mounted on said second driven shaft at said delivery orifice, whereby said disintegrator element may be rotated and simultaneously revolved in place about an axis substantially coincident with the axis of said directing member.

HOWARD SNOW.
RUDOLPH HOVAN HOCUTT.

REFERENCES CITED

The following references are of record in the file of this patent:

UNITED STATES PATENTS

| Number | Name | Date |
|---|---|---|
| 119,801 | Tisdale | Oct. 10, 1871 |
| 969,829 | Agrell | Sept. 13, 1910 |
| 969,830 | Agrell | Sept. 13, 1910 |
| 1,065,365 | Higgins | June 24, 1913 |
| 1,691,196 | Jirotka | Nov. 13, 1928 |
| 1,937,446 | Stampe | Nov. 28, 1933 |
| 2,215,435 | Hale | Sept. 17, 1940 |
| 2,368,870 | Pagendarm | Feb. 6, 1945 |